United States Patent
Tabata et al.

(10) Patent No.: US 8,900,698 B2
(45) Date of Patent: Dec. 2, 2014

(54) POLYLACTIC ACID RESIN SHEET AND MOLDED ARTICLE

(75) Inventors: Hisataka Tabata, Otsu (JP); Taisei Matsumoto, Otsu (JP); Takeshi Ishii, Otsu (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 13/812,200

(22) PCT Filed: Jul. 12, 2011

(86) PCT No.: PCT/JP2011/065875
§ 371 (c)(1),
(2), (4) Date: Jan. 25, 2013

(87) PCT Pub. No.: WO2012/014670
PCT Pub. Date: Feb. 2, 2012

(65) Prior Publication Data
US 2013/0123404 A1    May 16, 2013

(30) Foreign Application Priority Data
Jul. 30, 2010  (JP) ................ 2010-171946

(51) Int. Cl.
*C08K 5/42*   (2006.01)
(52) U.S. Cl.
USPC .................... 428/339; 524/158; 524/166
(58) Field of Classification Search
USPC ................. 524/158, 166; 428/339
See application file for complete search history.

(56) References Cited

U.S. PATENT DOCUMENTS

| | | | |
|---|---|---|---|
| 2006/0019111 A1* | 1/2006 | Sawai et al. | 428/480 |
| 2009/0053489 A1* | 2/2009 | Yamamura et al. | 428/213 |
| 2010/0240820 A1* | 9/2010 | Sato et al. | 524/533 |

FOREIGN PATENT DOCUMENTS

| | | |
|---|---|---|
| JP | 10-017757 A | 1/1998 |
| JP | 10-036650 A | 2/1998 |
| JP | 2000-355089 A | 12/2000 |
| JP | 2001-146547 A | 5/2001 |
| JP | 2002-012687 A | 1/2002 |
| JP | 2002-114895 A | 4/2002 |
| JP | 2003-261757 A | 9/2003 |
| JP | 2004-067801 A | 3/2004 |
| JP | 2007-002105 A | 1/2007 |
| WO | 2009/004769 A1 | 1/2009 |

OTHER PUBLICATIONS

Machine translation of JP 2003-261757. Sep. 2003.*
Machine translation of JP 2007-002105. Jan. 2007.*
Paraloid BPM 500 Data Sheet. 2007.*

* cited by examiner

*Primary Examiner* — John Uselding
(74) *Attorney, Agent, or Firm* — DLA Piper LLP (US)

(57) ABSTRACT

A polylactic acid based resin sheet includes a layer formed of a composition (D) containing polylactic acid (A), an ionic surface active agent (B), and a nonionic surface active agent (C), wherein
the polylactic acid (A) has a content of 50 mass % or more and 99.5 mass % or less in the entire 100 mass % of the composition (D), and
the mass ratio between the ionic surface active agent (B) and the nonionic surface active agent (C) satisfies $2 \leq (B)/(C) \leq 20$.

10 Claims, No Drawings

POLYLACTIC ACID RESIN SHEET AND MOLDED ARTICLE

RELATED APPLICATIONS

This is a §371 of International Application No. PCT/JP2011/065875, with an international filing date of Jul. 12, 2011 (WO 2012/014670 A1, published Feb. 2, 2012), which is based on Japanese Patent Application No. 2010-171946, filed Jul. 30, 2010, the subject matter of which is incorporated herein by reference.

TECHNICAL FIELD

This disclosure relates to a polylactic acid based resin sheet that is high in antistatic property, transparency, and blocking resistance, and suitable particularly for production of printed moldings.

BACKGROUND

In recent years, global warming due to an increase in concentration of carbon dioxide gas in the atmosphere is becoming a global issue. Active efforts have been made in various industrial fields aiming to develop techniques for reduction in carbon dioxide gas release to the atmosphere. In the field of plastics production, plastic products have been conventionally produced from general-purpose oil-derived input materials and, after use, their waste is processed by incineration etc., resulting in discharge of carbon dioxide gas into the atmosphere. In recent years, attention is focused on plastics produced from plant-derived materials, which originate from carbon (carbon dioxide gas) in the atmosphere. In particular, research and development has been actively performed towards developing practical polylactic acid based materials, which are generally high in transparency and relatively advantageous in terms of cost as well.

Among other biodegradability plastics, polylactic acid has a relatively high glass transition point of about 57° C. as well as high rigidity, and it is now drawing attention as alternatives to materials such as polyethylene terephthalate (PET) and polystyrene (PS). Efforts are made to develop sheets that are suitable for production of sundry goods, such as clear file folders, and molded food containers. Polylactic acid, as well as other general polymer compounds, is easily electrified by friction or the like, and accordingly suffers from damage to appearance caused by adhered dust or deterioration in processability as a result of electrification causing blocking between sheets when used in the form of processed sheets.

Generally available methods to make sheets antistatic include coating sheet surfaces with an antistatic agent and kneading an antistatic agent directly into sheets during an extrusion step.

Japanese Unexamined Patent Publication (Kokai) No. 2002-12687 discloses a technique designed to coat polylactic acid material with an anionic surface active agent and a specific nonionic surface active agent.

Japanese Unexamined Patent Publication (Kokai) No. 2002-114895 discloses a technique designed to mix an electrically conductive agent into polylactic acid material.

Japanese Unexamined Patent Publication (Kokai) N. HEI 10-17757 discloses a technique designed to mix an anionic surface active agent into polylactic acid material.

Japanese Unexamined Patent Publication (Kokai) No. 2004-67801 discloses a technique designed to mix an ionic surface active agent and a nonionic surface active agent into polylactic acid material.

The technique described in JP '687 has some disadvantages. The resulting films tend to have stickiness or suffer from blocking, and coated films will often fail in making a good contact with ink and will not be suitable for printing.

The technique described in JP '895 cannot maintain high transparency though it is a good feature of polylactic acid.

The technique described in JP '757 is designed to increase the decomposition speed of polylactic acid, and cannot serve for maintain antistatic property.

The technique described in JP '801 can provide films with antistatic property, but they are not sufficiently high in blocking resistance, and cannot maintain antistatic property after undergoing a heat history such as thermoforming.

As described above, it is still impossible for the conventional techniques top provide a polylactic acid based resin sheet that is high in antistatic property, transparency, and blocking resistance, and suitable particularly for production of printed moldings.

Thus, in view of such a background, it could be helpful to provide a polylactic acid based resin sheet that is high in antistatic property, transparency, and blocking resistance, and suitable particularly for production of moldings.

SUMMARY

We thus provide:
(1) A polylactic acid based resin sheet including a layer formed of a composition (D) containing a polylactic acid (A), an ionic surface active agent (B), and a nonionic surface active agent (C), wherein
the polylactic acid (A) has a content of 50 mass % or more and 99.5 mass % or less in the entire 100 mass % of the composition (D), and
the mass ratio between the ionic surface active agent (B) and the nonionic surface active agent (C) satisfies $2 \leq (B)/(C) \leq 20$.
(2) A polylactic acid based resin sheet as defined in paragraph (1) wherein
the ionic surface active agent (B) has a sulfo group, and
the nonionic surface active agent (C) is at least one selected from the group consisting of:
aliphatic alkanol amide, polyglycerin fatty acid ester, higher alcohol (i), alkyl phenol (ii), fatty acid ester (iii), aliphatic amine (iv), aliphatic amide (v), polypropylene glycol (vi), sorbitan fatty acid ester (vii), and ethylene oxide adducts of (i) to (vii).
(3) A polylactic acid based resin sheet as defined in either paragraph (1) or (2) that has a haze value of 10% or less.
(4) A polylactic acid based resin sheet as defined in any of paragraphs (1) to (3) that has a wetting tension of 40 mN/m or more.
(5) A polylactic acid based resin sheet as defined in any of paragraphs (1) to (4) wherein an impact strength modifier contained accounts for 2 mass % or more and 20 mass % or less in the entire 100 mass % of the composition (D).
(6) A polylactic acid based resin sheet as defined in any of paragraphs (1) to (5) that is designed to be processed by hot-plate-direct-heating-type vacuum molding or hot-plate-direct-heating-type vacuum air-pressure molding.
(7) A molded product produced from a polylactic acid based resin sheet as defined in any of paragraphs (1) to (6).

We provide a polylactic acid based resin sheet that is high in antistatic property, transparency, and blocking resistance, and suitable particularly for production of printable moldings. Furthermore, moldings produced from the polylactic acid based resin sheet are high in antistatic property, and suitable for production of preferred printed moldings such as clear file folders and clear cases. The polylactic acid based resin sheet can maintain good characteristics such as antistatic property, antifogging property, transparency, and blocking resistance when processed by hot-plate-direct-heating-type vacuum molding or hot-plate-direct-heating-type vacuum air-pressure molding.

DETAILED DESCRIPTION

The polylactic acid based resin sheet is described in detail below. Hereinafter, the term "sheet" refers to two-dimensional structures including, for instance, film and plate.

It is important for the polylactic acid based resin sheet to include a layer formed of a composition (D) containing polylactic acid (A), an ionic surface active agent (B), and a nonionic surface active agent (C).

If, for instance, the composition (D) consists only of polylactic acid (A) and an ionic surface active agent (B) or only of polylactic acid (A) and a nonionic surface active agent (C), it will be necessary to add a surface active agent in a large amount to develop required antistatic property, which will lead to a sheet with poor transparency.

A sheet with antistatic property is defined as one that has a surface specific resistance of $10^{12}$ Ω/□ or less.

The fact that the polylactic acid based resin sheet includes a layer formed of a composition (D) containing a polylactic acid (A), an ionic surface active agent (B), and a nonionic surface active agent (C) ensures that a relatively small amount of a surface active agent can work effectively, allowing the sheet to have antistatic property while maintaining transparency.

It is important for the polylactic acid based resin sheet to include a layer formed of a composition (D) containing a polylactic acid (A), an ionic surface active agent (B), and a nonionic surface active agent (C) and for the polylactic acid (A) to have a content of 50 mass % or more and 99.5 mass % or less in the entire 100 mass % of the composition (D).

If the content of the polylactic acid (A) is less than 50 mass % in the entire 100 mass % of the composition (D), the plant-derived content will be too small to provide a technique for developing a polylactic acid based resin sheet and moldings that serve for practical use. If the content of the polylactic acid (A) is more than 99.5 mass % in the entire 100 mass % of the composition (D), on the other hand, the content of the surface active agent will be too small to develop adequate antistatic property.

To maintain a high the plant-derived content, it is preferable that the content of the polylactic acid (A) is 80 mass % or more and 99.5% or less in the entire 100 mass % of the composition (D).

It is important that the polylactic acid based resin sheet include a layer formed of a composition (D) containing a polylactic acid (A), an ionic surface active agent (B), and a nonionic surface active agent (C), that the polylactic acid (A) has a content of 50 mass % or more and 99.5 mass % or less in the entire 100 mass % of the composition (D), and that the mass ratio between the ionic surface active agent (B) and the nonionic surface active agent (C) is as follows: $2 \leq (B)/(C) \leq 20$.

There is a conventional technique that makes polylactic acid highly antistatic by adding various surface active agents in large amounts, but it fails to maintain good characteristics such as transparency, that are inherent in polylactic acid. As a result of intensive studies on this problem, we found that a strong antistatic effect can be realized using a surface active agent in a much smaller amount than required by the conventional technique if a specific surface active agent as given above is added to a specific content. Concretely, a strong antistatic effect can be achieved, as described above, by combining a relatively large amount of an ionic surface active agent (B) and a relatively small amount of a nonionic surface active agent (C) in the mass ratio range of $2 \leq (B)/(C) \leq 20$. The mechanism that brings about the effect has not been clarified yet, but it is believed to be as described below.

Basically, the various surface active agents added to and mixed with polylactic acid, and subsequently subjected to melting and molding in some cases, must move towards and bleed to the surface of the molded product over time to make it antistatic. In general, a comparison between an ionic surface active agent (B) and a nonionic surface active agent (C) added singly to polylactic acid shows that the former is more effective in making it antistatic when added in a relatively small amount, but tends to increase the haze value. We believe that the combined use of a relatively large amount of an ionic surface active agent (B) with a relatively small amount of nonionic surface active agent (C) drastically promotes the movement and bleeding of the agent (B) to the surface as compared with the independent use of the agent (B), serving to make the surface antistatic even in cases where the total amount of the surface active agents (B) and (C) is still very small.

From such a point of view as described above, if the mass ratio, (B)/(C), between the ionic surface active agent (B) and the nonionic surface active agent (C) is smaller than 2, it is necessary to add a large amount of the ionic surface active agent (B) to make the surface antistatic, leading to deterioration in transparency. If the ratio (B)/(C) is larger than 20, on the other hand, transparency is impaired for the same reason.

When the mass content of the ionic surface active agent (C) is larger than that of the nonionic surface active agent (B), both the surface active agents (B) and (C) will be required in large amounts to achieve an antistatic effect, leading to a decrease in melt viscosity during the sheet molding step and in turn a defective molded product. Furthermore, nonionic surface active agents are vulnerable to heat, and cause blocking between sheets that have become sticky after undergoing heat history.

It is preferable that the mass ratio, (B)/(C), between the ionic surface active agent (B) and the nonionic surface active agent (C) satisfies $5 \leq (B)/(C) \leq 15$, more preferably $5 \leq (B)/(C) \leq 10$.

A surface active agent used herein is a compound containing a hydrophilic group and a lipophilic group in its molecular chain.

Of the surface active agents defined above, an ionic surface active agent (B) is a surface active agent containing a hydrophilic group that is ionized when dissolved in pure water. The ionic surface active agent (B) to be used may be either a cationic surface active agent or an anionic surface active agent, and may be a mixture of a cationic surface active agent and an anionic surface active agent.

A cationic surface active agent is a surface active agent containing a hydrophilic group that is ionized in pure water to form a cation while an anionic surface active agent is a surface active agent containing a hydrophilic group that is ionized in pure water to form an anion.

Of the surface active agents defined above, a nonionic surface active agent (C) is a surface active agent containing a hydrophilic group that is not ionized in pure water.

Hydrophilic groups are functional groups that are easily dissolved in water and can be divided into the following categories: hydrophilic groups that are ionized in pure water to form cations, hydrophilic groups that are ionized in pure water to form anions, and hydrophilic groups that are not ionized in pure water.

Specifically, the hydrophilic groups that are ionized in pure water to form cations include, for example, tertiary amino groups.

Specifically, the hydrophilic groups that are ionized in pure water to form anions include, for example, sulfo groups and carboxyl groups.

Specifically, the hydrophilic groups that are not ionized in pure water include, for example, hydroxyl groups and amide groups.

Lipophilic groups are functional groups that are not dissolved easily in water and, specifically, they include alkyl groups, alkenyl groups, cycloalkyl groups, and aryl groups.

The polylactic acid based resin sheet may be either a monolayer sheet including only a layer formed of the composition (D) or a layered sheet including other layers in addition to a layer formed of the composition (D). In a layered sheet, it is preferable that at least either of the outermost layers is a layer formed of a composition (D), and it is more preferable that both outermost layers of the sheet are a layer formed of a composition (D) to develop antistatic property while maintaining transparency.

In the polylactic acid based resin sheet, it is preferable that the ionic surface active agent (B) has a sulfo group, and the nonionic surface active agent (C) is at least one selected from the group consisting of:

aliphatic alkanol amide, polyglycerin fatty acid ester, higher alcohol (i), alkyl phenol (ii), fatty acid ester (iii), aliphatic amine (iv), aliphatic amide (v), polypropylene glycol (vi), sorbitan fatty acid ester (vii), and ethylene oxide adducts of (i) to (vii).

Preferable examples of the ionic surface active agent (B) containing a sulfo group include, for instance, those ionic surface active agents containing an alkyl group, alkyl aryl group, other lipophilic groups, or a hydrophilic sulfo group that can be ionized in pure water to form an anion. The ionic surface active agent (B) containing a sulfo group preferably has a molecular weight of 1,000 or less, and particular, an ionic surface active agent with a molecular weight of 100 or more and 500 or less is preferable.

As the ionic surface active agent (B) containing a sulfo group, a metal salt of an alkyl sulfonic acid, for instance, is preferred. In the case where the ionic surface active agent (B) is a metal salt of an alkyl sulfonic acid, the alkyl group preferably has a carbon number of 11 to 15 from the viewpoint of its antistatic effect. In the case where the ionic surface active agent (B) is a metal salt of an alkyl sulfonic acid, furthermore, the metal salt may be a sodium salt, potassium salt, lithium salt, calcium salt, or magnesium salt, of which sodium salt is preferable. These metal salts of an alkyl sulfonic acid may be used singly or as combination of two or more thereof.

Described below are compounds used as the nonionic surface active agent (C).

A aliphatic alkanol amide preferred as the nonionic surface active agent (C) can be synthesized through condensation of a higher fatty acid and an alkanol amide. There are no specific limitations on the higher fatty acid to be used, but fatty acids of C12 to 20 are preferable. Specifically, a preferable higher fatty acid is stearic acid. Preferable alkanol amides include diethanol amine, monoethanol amine, and isopropanol amine.

In the higher alcohol (i), alkyl phenol (ii), fatty acid ester (iii), aliphatic amine (iv), and aliphatic amide (v) that are preferred as the nonionic surface active agent (C), the alkyl group contained is preferably of C8 to C22.

In the ethylene oxide adducts of the compounds (i) to (v) given above that are preferred as the nonionic surface active agent (C), the number of moles of the ethylene oxide added is commonly 2 to 20 depending on the lipophilic group bonded to it. If the number of moles added is large, they tend to cause deterioration in transparency and a decrease in biodegradability.

The polypropylene glycol (vi) that is preferred as the nonionic surface active agent (C) is preferably a compound with a molecular weight of 500 to 5,000.

In the ethylene oxide adducts of polypropylene glycol (vi) that is preferred as the nonionic surface active agent (C), the number of moles of the ethylene oxide added is commonly 2 to 20 depending on the lipophilic group bonded to it.

In a sorbitan fatty acid ester (vii) that is preferred as the nonionic surface active agent (C), the fatty acid contained is preferably of C12 to C18.

In the ethylene oxide adducts of the sorbitan fatty acid ester (vii) that are preferred as the nonionic surface active agent (C), the number of moles of the ethylene oxide added is commonly 2 to 20 depending on the lipophilic group bonded to it.

The fatty acid in a polyglycerin fatty acid ester that is preferred as the nonionic surface active agent (C) is preferably a compound with a carbon number of 12 to 18. The glycerin may be a di-, tetra-, or deca-glycerin, of which tetraglycerin is preferable.

From the viewpoint of the compatibility with polylactic acid, ethylene oxide addition products of an aliphatic amine (iv) is particularly preferable as the nonionic surface active agent (C).

It is preferable that the polylactic acid based resin sheet have a haze value of 10% or less. If the haze value is 10% or less, moldings produced from such a polylactic acid based resin sheet can serve preferably as packaging containers and packaging sheets that have good design characteristics such as container content visibility and product appearance. If the haze value is more than 10%, on the other hand, the products may be poor in transparency and unsuitable for practical use. If the haze value is less than 1%, the sheet products may be liable to suffer from flaws, and products such as packaging containers and packaging sheets produced from such layered sheets may have poor appearance, and accordingly, the haze value is preferably 1% or more. It is more preferable that the polylactic acid based resin sheet has a haze value of 2% or more and 8% or less. The lower limit of the haze value is 1% as described above, but a haze value of about 4% or more is satisfactory for uses requiring transparency such as packaging containers and packaging sheets.

To maintain a haze value of 10% or less, it is preferable that the total content of the ionic surface active agent (B) and the nonionic surface active agent (C) is preferably 0.2 mass % or more and 1.3 mass % or less in the entire 100 mass % of the composition (D). If the content of (B), (C), and (D) is an above-mentioned range, it is possible to maintain both a high antistatic property and a low haze value. With respect to the content of the ionic surface active agent (B) and the nonionic surface active agent (C), it is more preferable from the same point of view that the combined content of the ionic surface active agent (B) and the nonionic surface active agent (C) is 0.2 mass % or more and 1.0 mass % in the entire 100 mass % of the composition (D).

The polylactic acid based resin sheet may be a layered sheet. In such a layered sheet, it is preferable that either or both of the outermost layers are formed of the composition (D) and that the layers of the composition (D) are thin. In the above case, this may be also preferable to maintain a high transparency of the polylactic acid based resin and develop a larger antistatic effect. If a layer of the composition (D) is used as an outermost layer in such a layered sheet, the thickness of the layer of the composition (D) is preferably 15 to 50 μm in most cases to make the surface adequately antistatic. From the viewpoint of smooth film production, furthermore, commonly it is preferable that the thickness of a single layer of the composition (D) accounts for 1/10 to 9/10 of the entire thickness of the layered sheet.

It is preferable that the polylactic acid based resin sheet has a wetting tension of 40 mN/m or more. If it is in this range, the sheet has not only antistatic effect but also a high defogging effect.

To maintain a wetting tension of 40 mN/m or more, it is preferable that the mass ratio, (B)/(C), between the ionic surface active agent (B) and the nonionic surface active agent (C) in the composition (D) meets the equation $6 \leq (B)/(C) \leq 18$.

Corona treatment of the surface of a layer formed of the composition (D) serves to cause the surface active agent to bleed out to the sheet surface to further increase the wetting tension. The practical upper limit of the wetting tension is 54 mN/m.

If the polylactic acid based resin sheet is in the form of a layered sheet, a preferred structure is in layers with an outermost layer formed of the composition (D) as described above, and in this case as well, the layer formed of the composition (D) preferably has a wetting tension of 40 mN/m or more.

For the polylactic acid based resin sheet, it is most preferable that the mass ratio, (B)/(C), between the ionic surface active agent (B) and the nonionic surface active agent (C) satisfies $6 \leq (B)/(C) \leq 10$ to achieve both antistatic property and antifogging property.

The polylactic acid (A) is defined as one in which L-lactic acid and/or D-lactic acid are included as primary components and lactic-acid-derived components account for 70 mol % or more and 100 mol % or less of the total monomer components constituting the polylactic acid material, which accounts for 100 mol %, and it is preferable to use a homo-polylactic acid material that is formed virtually only of L-lactic acid and/or D-lactic acid.

It is preferable that the polylactic acid is crystalline. A crystalline homo-polylactic acid (A) is defined as one that releases heat of crystal fusion attributed to polylactic acid components as determined by differential scanning calorimetry (DSC) in an appropriate temperature range after adequate crystallization of the homo-polylactic acid by heating. Commonly, homo-polylactic acid increases in melting point and crystallinity with an increasing optical purity. The melting point and crystallinity of polylactic acid is affected by its molecular weight and catalysts used for its polymerization but, commonly, a homo-polylactic acid material with an optical purity of 98% or more has a melting point of 170° C. or so and has a relatively high crystallinity. On the other hand, the melting point and crystallinity decreases with a decreasing optical purity. A homo-polylactic acid material with an optical purity of 88%, for instance, has a melting point of about 145° C., and a homo-polylactic acid material with an optical purity of 75% has a melting point of about 120° C. A homo-polylactic acid material with an optical purity of less than 70% is generally non-crystalline and does not show a definite melting point.

Depending on its uses as layered sheets, a homo-polylactic acid (A) may be a mixture of a crystalline homo-polylactic acid and an amorphous homo-polylactic acid that can develop or improve required functions. In this case, an appropriate content of the amorphous homo-polylactic acid may be adopted as long as it does not impair the desired effect. To provide a layered sheet with relatively high heat resistance, it is preferable that the polylactic acid material to be used contains at least one polylactic acid component with an optical purity of 95% or more.

The polylactic acid (A) commonly has a weight average molecular weight of at least 50,000 or more, preferably 80,000 to 400,000, and more preferably 100,000 to 300,000. The weight average molecular weight referred to here is defined as a molecular weight measured by gel permeation chromatography (GPC) using a column consisting of Shodex GPC HFIP-806M and Shodex GPC HFIP-LG connected in series and using a chloroform as solvent, and converted in terms of polymethyl methacrylate (PMMA).

The polylactic acid (A) with a weight average molecular weight of 50,000 or more serves to produce a layered sheet containing the polylactic acid with good mechanical characteristics, and also allow processed products with good mechanical characteristics to be produced from the layered sheet.

The polylactic acid (A) may be a copolymerized polylactic acid comprising an ester-forming monomer component copolymerized with L-lactic acid and/or D-lactic acid. Examples of the copolymerizable monomer component include hydroxycarboxylic acid such as glycolic acid, 3-hydroxybutyric acid, 4-hydroxybutyric acid, 4-hydroxyvaleric acid, and 6-hydroxycaproic acid; compounds containing two or more hydroxyl groups in one molecule such as ethylene glycol, propylene glycol, butanediol, neopentyl glycol, polyethylene glycol, glycerin, and pentaerythritol; derivatives thereof; compounds containing two or more carboxylic acid groups in one molecule such as succinic acid, adipic acid, sebacic acid, fumaric acid, terephthalic acid, isophthalic acid, 2,6-naphthalene dicarboxylic acid, 5-sodium sulfoisophthalic acid, and 5-tetrabutyl phosphonium sulfoisophthalic acid; and derivatives thereof. Of the copolymerization components given above, it is preferable to use a biodegradable one, depending on the uses. It is preferable that these copolymerization components account for 0 mol % or more and 30 mol % or less of the total monomer components constituting the polylactic acid (A), which accounts for 100 mol %.

Details will be described later, but the methods available for producing the polylactic acid (A) include direct polymerization from lactic acid, and ring opening polymerization via lactide.

When the polylactic acid based resin sheet is applied to uses such as packaging of various industry products, that do not require biodegradability or commonly require durability for long-term storage, it is preferable that the carboxyl end groups in the polylactic acid account for 0 equivalent/$10^3$ kg or more and 30 equivalents/$10^3$ kg or less, more preferably 20 equivalents/$10^3$ kg or less, and still more preferably 10 equivalents/$10^3$ kg or less to develop a high durability by depressing the strength deterioration of the polylactic acid that may be caused by hydrolysis. If the carboxyl end groups in the polylactic acid account for 30 equivalents/$10^3$ kg or less, the quantity of carboxyl end groups, which can act as autocatalyst for hydrolysis, is maintained at an adequately low level, making it possible to developing a practically high durability in many cases, depending on the intended uses.

The methods available to maintain the quantity of carboxyl end groups in polylactic acid at 30 equivalents/$10^3$ kg or less include, for instance, the method of controlling it by using an appropriate catalyst or heat history during the synthesis of the polylactic acid, the method of relaxing the heat history by, for instance, decreasing the extrusion temperature or shortening the residence time during the sheet production process, and the method of using a reactive compound to cap the carboxyl end groups.

If a reactive compound is used to cap the carboxyl end group, it is preferable that at least part of the carboxyl end groups in the polylactic acid are capped, and it is more preferable that all of them are capped. The usable reactive compounds include, for instance, condensation-reactive compounds such as aliphatic alcohols and amide compounds, and addition-reactive compounds such as carbodiimide compounds, epoxy compounds, and oxazoline compounds, of which addition-reactive compounds are preferable because unnecessary by-products will not be formed in large amounts during the reaction, and in particular, carbodiimide compounds are highly preferable from the viewpoint of reaction efficiency.

The polylactic acid based resin sheet may contain, as required, generally known antioxidant, ultraviolet ray stabilization agent, color protection agent, delustering agent, deodorant, flame retardant, weathering agent, antioxidant, ion exchange agent, crystal nucleating agent, and color pigment, as well as lubricants including inorganic fine particles, organic particles, and other organic lubricants, unless they impair the effect.

Effective antioxidants include hindered phenolic ones and hindered amine based ones. Effective color pigments include inorganic pigments such as carbon black, titanium oxide, zinc oxide, and iron oxide, and organic pigments such as cyanine based ones, styrene based ones, phthalocyanine based ones, anthraquinone based ones, perinone based ones, isoindolinone based ones, quinophtharone based ones, quinacridone based ones, and thioindigo based ones.

If particles are to be added with the aim of providing processed products with improved lubricity and blocking resistance, the effective inorganic particles include fine particles of silicon oxides such as silica; various carbonates such as calcium carbonate, magnesium carbonate, and barium carbonate; various sulfates such as calcium sulfate and barium sulfate; various composite oxides such as kaolin and talc; various phosphates such as lithium phosphate, calcium phosphate, and magnesium phosphate; various oxides such as aluminum oxide, titanium oxide, and zirconium oxide; and various salts such as lithium fluoride.

Preferred organic particles include fine particles of calcium oxalate and terephthalates of calcium, barium, zinc, manganese, and magnesium. Effective crosslinked polymer particles include fine particles of a homopolymer or copolymer produced from vinyl based monomers such as divinylbenzene, styrene, acrylic acid, and methacrylic acid. Other preferred ones include organic fine particles of polytetrafluoroethylene, benzo guanamine resin, thermosetting epoxy resin, unsaturated polyester resin, thermosetting urea resin, and thermosetting phenol resin.

There are no specific limitations on the average particle diameter of the inorganic particles and organic particles, but it is preferably 0.01 to 5 µm, more preferably 0.05 to 3 µm, and most preferably 0.08 to 2 µm.

The composition (D) of the polylactic acid based resin sheet may contain an impact strength modifier at 2 mass % or more and 20 mass % or less in the entire 100 mass % of the composition (D) with the aim of improving the impact resistance. It is more preferably 2.5 mass % or more and 15 mass % or less. The impact resistance is improved more with an increasing content of an impact strength modifier, but in many cases, an impact resistance does not bring about a large improvement in impact strength if its content exceeds 20 mass %.

An impact strength modifier as referred to herein is an additive that serves to reduce the brittle characteristics inherent to polylactic acid, which is brittle and cracked easily. Additives having such an effect include those which, when mixed in polylactic acid, act to form a sea-island structure in which the polylactic acid is the sea component while the additive is the island component, with the additive being in the form of dispersed particles commonly smaller than spheres with a diameter of about 10 µm. In this case, it is effective to use a so-called "soft" additive that has a lower elastic modulus than that of the polylactic acid.

Specifically, such impact strength modifiers include, for instance, ethylene-propylene copolymer, ethylene/propylene-nonconjugated diene copolymer, ethylene-1-butene copolymer, ethylene-acrylic acid copolymer, alkali metal salt thereof (so-called ionomer), ethylene-glycidyl (meth)acrylate copolymer, ethylene-acrylic acid alkyl ester copolymer (for instance, ethylene-ethyl acrylate copolymer, and ethylene-butyl acrylate copolymer), acid-modified ethylene-propylene copolymer, diene rubber (for instance, polybutadiene, polyisoprene, and polychloroprene), copolymer of a diene and a vinyl monomer (for instance, styrene-butadiene random copolymer, styrene-butadiene block copolymer, styrene-butadiene-styrene block copolymer, styrene-isoprene random copolymer, styrene-isoprene block copolymer, styrene-isoprene-styrene block copolymer, polybutadiene graft-copolymerized with styrene, and butadiene-acrylonitrile copolymer), polyester-diols or dicarboxylic acid block copolymer, polyisobutylene, copolymer of isobutylene with butadiene or isoprene, natural rubber, Thiokol rubber, polysulfide rubber, acrylic rubber, silicone rubber, polyurethane rubber, polyether rubber, epichlorohydrin rubber, aliphatic polyester, polyester based elastomer, and polyamide based elastomer.

Furthermore, specific examples of the impact strength modifier include various polymers with different degrees of crosslinking, those of various microstructures such as cis structure and trans structure, and multi-layered polymers consisting of a core layer and one or more shell layers that cover the former.

Preferable impact strength modifiers include aliphatic polyesters other than the polylactic acid (A), and aliphatic aromatic polyesters, because they are dispersed to a preferable degree in polylactic acid and serve effectively in small amounts to enhance the impact strength.

There are no specific limitations on the aliphatic polyesters other than the polylactic acid (A), and aliphatic aromatic polyesters, and specifically they include polyglycolic acid, poly3-hydroxybutyric acid, poly4-hydroxybutyric acid, poly4-hydroxyvaleric acid, poly3-hydroxyhexanoic acid, polycaprolactone, polyethylene adipate, polyethylene succinate, polybutylene succinate, and polybutylene succinate adipate.

To improve the impact resistance while maintaining the transparency and also maintaining the biodegradability of a polylactic acid based resin sheet, it is preferable to use a polybutylene succinate based resin, which is a aliphatic polyester other than the polylactic acid (A), as impact strength modifier. A more preferable impact strength modifier is polybutylene succinate adipate, which serves effectively to enhance the impact resistance and has a high compatibility with polylactic acid.

A polybutylene succinate based resin preferably has a weight average molecular weight of 100,000 to 300,000. Products of such a polybutylene succinate based resin include, for instance, GsPla FZ71PD (trade name and product number; supplied by Mitsubishi Chemical Corporation) and Bionolle #3003 (trade name and product number; Showa Highpolymer Co., Ltd.) and, for instance, polybutylene succinate can be produced by condensation polymerization of 1-4-butanediol and succinic acid.

Preferable impact strength modifiers also include multi-layered polymers because they are dispersed to a preferable degree in polylactic acid and serve effectively in small amounts to enhance the impact strength.

A multi-layered polymer is a multi-layered structure polymer having a so-called "core-shell" type structure that consists of an innermost layer (core layer) and one or more layers (shell layers) that cover the former, in which adjacent layers are formed of polymers of different species. There are no specific limitations on the number of layers that constitute a multi-layered structure polymer, as long as it is two or more, and accordingly, it may consist of three or more layers or four or more layer. It is preferable that such a multi-layered structure polymer include at least one or more rubber layers in its inside (specifically, preferably has one or more rubber layers which are not the outermost layers).

With respect to the rubber layers, there are no specific limitations on the type of rubber as long as they are formed of a polymer component that has rubber elasticity. Rubber elasticity is defined as elasticity caused by expansion and contraction of polymer chains.

A multi-layered structure polymer to be contained as an impact strength modifier is preferably a core-shell type acrylic based polymer because it can improve impact resistance while maintaining transparency, though it does not have biodegradability.

In more detail, the rubbers useful as the rubber layer in a multi-layered structure polymer include, for instance, those produced by polymerization of, for instance, an acrylic component, silicone component, styrene component, nitrile component, conjugated diene component, urethane component, or ethylene propylene component.

The polymer components preferred in the rubber layer include rubbers produced by polymerization of, for instance, acrylic components such as ethyl acrylate unit and butyl acrylate unit; silicone components such as dimethyl siloxane unit and phenyl methyl siloxane unit; styrene components such as styrene unit and a-methyl styrene unit; nitrile components such as acrylonitrile unit and methacrylonitrile unit; and conjugated diene components such as butadiene unit and isoprene unit. Furthermore, it is also preferable to use a rubber produced by copolymerization of two or more of these components, such as: (1) a rubber comprising a component produced by copolymerization of an acrylic component such as ethyl acrylate unit and butyl acrylate unit and a silicone component such as dimethyl siloxane unit and phenyl methyl siloxane unit; (2) a rubber comprising a component produced by copolymerization of an acrylic component such as ethyl acrylate unit and butyl acrylate unit and a styrene component such as styrene unit and α-methyl styrene unit; (3) a rubber comprising a component produced by copolymerization of an acrylic component such as ethyl acrylate unit and butyl acrylate unit and a conjugated diene component such as butadiene unit and isoprene unit; and (4) a rubber comprising a component produced by copolymerization of an acrylic component such as ethyl acrylate unit and butyl acrylate unit, a silicone component such as dimethyl siloxane unit and phenyl methyl siloxane unit, and a styrene component such as styrene unit and α-methyl styrene unit. It is also preferable to use a rubber produced by copolymerization involving a crosslinkable component such as divinylbenzene unit, allyl acrylate unit, and butylene glycol diacrylate unit, in addition to the above components.

Preferable multi-layered structure polymers include those multi-layered structure polymers consisting of one core layer and one shell layer such as: a multi-layered structure polymer consisting of a core layer formed of a rubber containing a component produced by copolymerization of a dimethyl siloxane unit and a butyl acrylate unit, and a shell layer formed of methyl methacrylate polymer; a multi-layered structure polymer consisting of a core layer formed of a rubber containing a component produced by copolymerization of a butadiene unit and a styrene unit, and a shell layer formed of a methyl methacrylate polymer; and a multi-layered structure polymer consisting of a core layer formed of a rubber containing a component produced by polymerization of a butyl acrylate unit, and a shell layer formed of a methyl methacrylate polymer. It is particularly preferable that the rubber layer is formed of a polymer containing a glycidyl methacrylate unit.

The polylactic acid based resin sheet may be a layered sheet, as described above, and in the case of a layered sheet, disposing a layer formed of the composition (D) as either or both of the outermost layers and decreasing the thickness of the layer(s) formed of the composition (D) can make the sheet antistatic while maintaining the high transparency of the polylactic acid, and in this case, the impact strength modifier used may be contained either in an outermost layer or in an inner layer.

There are no specific limitations on the method to be used to melt-knead polylactic acid and an impact strength modifier, and common mixers including a kneader, roll mill, Banbury mixer, and single or twin screw extruder may be used. In particular, it is preferable to use a single or twin screw extruder from the viewpoint of productivity.

There are no specific limitations on the order of mixing and, for instance, polylactic acid and an impact strength modifier may be dry-blended first and then fed to a melt-kneading machine, or polylactic acid and an impact strength modifier may be melt-kneaded to prepare a masterbatch, followed by melt-kneading of the masterbatch and polylactic acid. Or, as needed, other components may be melt-kneaded together, or polylactic acid and other additives may be melt-kneaded first to prepare a masterbatch, followed by melt-kneading of this masterbatch with polylactic acid.

Polylactic acid can be produced by, for instance, a process as follows. A material formed mainly of L-lactic acid or D-lactic acid as lactic acid component may be used as starting material, and a hydroxycarboxylic acid other than the lactic acid component may be used in combination. A cyclic ester intermediate of a hydroxycarboxylic acid such as lactide and glycolide may also be used as starting material. Dicarboxylic acids and glycols may also be usable.

Polylactic acid can be produced by direct dehydration and condensation of the starting material, or ring opening polymerization of the cyclic ester intermediate. In the case where direct dehydration and condensation, for instance, are carried out for production, a high-molecular weight polymer is obtained by performing azeotropic dehydration and condensation of lactic acid or a mixture of lactic acid and a hydroxycarboxylic acid preferably in the presence of an organic solvent, particularly a phenyl ether based solvent, or particularly preferably by removing water from the solvent distilled out from the azeotropic step to provide a virtually water-free solvent, followed by feeding it back to the reaction system for polymerization.

It is also known that a high-molecular weight polymer can be produced also by subjecting a cyclic ester intermediate such as lactide to ring opening polymerization under reduced pressure using a catalyst such as tin octylate. A polymer with a smaller lactide content can be produced by, for instance, the following methods: the method of controlling the conditions for removal of water and low molecule compounds in the organic solvent during heated reflux, the method of deactivating the catalyst after completion of the polymerization reaction to depress depolymerization, and the method of heat-treating the resulting polymer.

The polylactic acid based resin sheet can be produced by conventional film production methods including T-die casting, inflation molding, and calendaring, of which the T-die casting method, which uses a T-die to melt-knead and extrude polylactic acid, is preferred. For instance, a typical production process based on T-die casting uses a polylactic acid material dried at 60 to 110° C. for 3 hours or more to reduce the moisture content to 400 ppm or less, and melt-kneading it at a cylinder temperature in the range of 150° C. to 240° C., preferably 200° C. to 220° C., to prevent degradation of the polylactic acid. The T-die temperature is also preferably controlled in the range of 200° C. to 220° C., and the material extruded from the T-die is cooled on a cooling roll at 30 to 40° C. to provide a sheet with a thickness of about 0.1 mm to 1.0 mm. In addition, it is preferable that the resulting sheet is subjected to various surface treatments to improve coating suitability. Available surface treatment methods include corona discharge treatment, plasma treatment, flame treatment, and acid treatment, and any of them can be used effectively, but corona discharge treatment is the most preferable because it can be performed continuously, needs only simple equipment that can be added easily to conventional film production facilities, and can be performed by simple operations.

The methods available for producing moldings from the polylactic acid based resin sheet include various forming processes such as vacuum forming, vacuum air-pressure forming, plug-assist forming, straight forming, free drawing, plug and ring forming, and skeleton forming, which can be applied to the polylactic acid based resin sheet. For the preheating of the sheet in these various forming methods, indirect heating and hot plate direct heating are available: the indirect heating method preheats a sheet using a heating apparatus located at a position away from the sheet, and the hot plate direct heating method preheats a sheet by bringing the sheet in contact with a hot plate.

The polylactic acid based resin sheet can be processed preferably by vacuum forming of the hot plate direct heating type or by vacuum air-pressure forming of the hot plate direct heating type.

In the case where a sheet having a coat layer is processed by the hot plate direct heating method, the coating agent in the coating layer is transferred to the hot plate during the sheet heating step, leading to deterioration in the antistatic property and antifogging property.

In the case where the polylactic acid based resin sheet is used, however, even if the surface active agent in the sheet surface is transferred to the hot plate during the direct heating step, the remaining surface active agent will bleed out and have an antistatic effect and defogging effect when the formed product is used.

Vacuum moldings that can be produced from the polylactic acid based resin sheet include, for instance, container-related products such as molded food containers and lids of beverage cups, various container packaging materials such as blister pack, other various molded products such as various trays that need to have antistatic or antifogging properties. It should be noted that the surface containing the composition (D) may be in any part of a product selected appropriately, but commonly, it is the inner surface of a container, package, or tray.

The polylactic acid based resin sheet can be printed after being molded into products. Molded products that can be produced from the polylactic acid based resin sheet include containers, blister packs, printed products, cards, clear file folders, and clear cases. Being printable by conventional printers and highly antistatic in spite of being transparent, the sheet can serve to produce transparent products such as clear cases, desktop calendar cases, and clear file folders. Preferred white-colored products, on the other hand, include cards.

There are no specific limitations on the entire thickness of the polylactic acid based resin sheet, it is normally about 0.1 mm to 1.0 mm from the viewpoint of uses of molded products. When the polylactic acid based resin sheet is used as material for containers and blister packs, the polylactic acid based resin sheet preferably has a total thickness of about 0.15 mm to 0.7 mm in most cases. When the polylactic acid based resin sheet is used to produce printable products, the sheet preferably has a total thickness of about 0.1 mm to 0.4 mm in most cases.

EXAMPLES

Our sheets and molded articles will be illustrated below in greater detail with reference to Examples, but it should be understood that this disclosure is not construed as being limited thereto.

[Measurement and Evaluation Methods]

Measurements and evaluations made in Examples were carried out under the following conditions.

(1) Antistatic Property

Using a resistivity chamber and digital ultra-high resistance/subpico ammeter supplied by ADC Corporation, the surface specific resistance of a polylactic acid based resin sheet was measured according to JIS-K 6911 (1962) in an atmosphere at a temperature of 23° C. and a humidity of 65%. Test was carried out three times at each level, and the three measurements were averaged.

(2) Ink Adhesion

An ultraviolet curable ink (UV STP Indigo, supplied by T&K Toka Corporation) was spread over a polylactic acid based resin sheet by the roll coating method to form an ink layer with a thickness of about 2 μm. Subsequently, a specimen was prepared by applying ultraviolet rays with an irradiation intensity of 80 W/cm$^2$ for 8 seconds from a distance of 9 cm to cure the ink.

The adhesion between the polylactic acid based resin sheet and the ink was evaluated based on the crosscut tape peeling test according to JIS-K 5600 (1999). Six parallel lines were made on a specimen in the longitudinal and the transverse direction (perpendicular to each other) using a box-cutter to produce 36 squares on a grid. A pressure sensitive adhesive tape (Cellotape (registered trademark), 24 mm wide, supplied by Nichiban Co., Ltd.) was applied over these squares, and uniform adhesion was assured. Then, the pressure sensitive adhesive tape was peeled off instantaneously, and the peeled state of the ink layer on the specimen was observed. Evaluation was made as follows based on the proportion of the squares left unpeeled.

In the case of a layered sheet, the layer formed of the composition (D) is evaluated.

○: 90% or more.
x: less than 90%.

(3) Blocking Resistance

Two A4-size specimen were cut out from a polylactic acid based resin sheet. One of them was put on top of the other, and a load of 200 g/cm$^2$ was applied, followed by leaving them to stand for 24 hours in an atmosphere at 40° C. The specimens were peeled off from each other, and their surfaces were observed. In the case of a layered sheet, the layer formed of the composition (D) is evaluated.

○: Free of blocking Peeled smoothly.

x: Interference patterns found, and not smoothly peeled in some portions.

(4) Haze Value (%)

A haze meter (HGM-2DP, supplied by Suga Test Instruments Co., Ltd.) was used to measure the haze value. Test was carried out five times at each level, and the five measurements were averaged.

(5) Thickness of Sheets

The thickness was measured with a microgauge at 10 points aligned in the width direction of a sheet, and the average t (mm) of the thickness measurements was taken as the thickness of the sheet.

(6) Wetting Tension (mN/m)

According to JIS-K 6768 (1999), various liquid mixtures for wetting tension test (supplied by Wako Pure Chemical Industries, Ltd.) were applied with a cotton swab over width 1 cm×length 6 cm portions of the surface of a polylactic acid based resin sheet. A reagent that made the film shrink within 2 sec was selected and used for measuring the wetting tension.

(7) Impact Resistance:Impact Value (N·m/mm)

A film impact tester (supplied by Toyo Seiki Seisaku-sho, Ltd.) was used with a hemispherical impact head with a diameter of ½ inch to measure the impact value in an atmosphere at a temperature of 23° C. and a humidity of 65% RH. Film samples of 100 mm×100 mm were prepared and five measurements were made at each level. Then, each measured impact value was divided by the thickness of the sample under test to calculate the impact value per unit thickness, and measurements were averaged. The sample thickness was measure with a digital micrometer.

(8) Antifogging Property

Molded Product 1

A polylactic acid based resin sheet was preheated for 1 sec between the upper and lower hot plates maintained at a temperature of 85° C. in a vacuum molding machine of the batch-wise hot plate direct heating type. A concave mold was pressed against the sheet sample and the interior was decompressed to produce a molded product in the form of a container lid with a size of about 9 cm×about 12 cm×about 2.5 cm (height). An appropriate sheet surface was selected so that the layer formed of the composition (D) comes inside of the container lid. A container bottom paired with the container lid was prepared elsewhere, and 100 ml of water at 25° C. was poured, followed by placing the molded lid and storing it in an atmosphere at 5° C. Subsequently, the fogging of the lid and water droplets formed were observed, and evaluation was made according to the following criteria.

○: Water droplets formed on the surface are connected to each other to form a film, leading to high content visibility.

Δ: Separate fine water droplets are found in some portions, leading to poor content visibility.

x: Separate fine water droplets spread over the entire surface, making the bottom invisible.

Molded Product 2

A polylactic acid based resin sheet was preheated for 1 sec between the upper and lower hot plates maintained at a temperature of 85° C. in a vacuum air-pressure molding machine of the batch-wise hot plate direct heating type. A concave mold was pressed against the sheet sample and the interior was decompressed while applying an air-pressure to produce a molded product in the form of a container lid with a size of about 9 cm×about 12 cm×about 2.5 cm (height). An appropriate sheet surface was selected so that the layer formed of the composition (D) comes inside of the container lid. A container bottom paired with the container lid was prepared elsewhere, and 100 ml of water at 25° C. was poured, followed by placing the molded lid and storing it in an atmosphere at 5° C. Subsequently, the fogging of the lid and water droplets formed were observed, and evaluation was made according to the following criteria.

○: Water droplets formed on the surface are connected to each other to form a film, leading to high content visibility.

Δ: Separate fine water droplets are found in some portions, leading to poor content visibility.

x: Separate fine water droplets spread over the entire surface, making the bottom invisible.

(9) Layer Thickness Ratio

A cross section of a sheet was photographed in transmitted light using a metallographic microscope (Leica DMLM, supplied Leica Microsystems GmbH) at a magnification of ×100 to determine the thickness of each layer and the thickness ratio of the layers.

[Polylactic Acid Used]

(PLA-1):

Poly-L-lactic acid resin with a poly-D-lactic acid content of 5.0 mol %, melting point of 150° C., and weight average molecular weight of 220,000 in terms of PMMA (4042D, supplied by NatureWorks LLC)

[Impact Strength Modifier Used]

(SP-1):

Polybutylene succinate resin (trade name GsPla FZ71PD, supplied by Mitsubishi Chemical Corporation)

[Impact Strength Modifier Master Batch Used]

(MB-1):

Core-shell type acrylic based polymer (30 mass % in entire 100 mass % of masterbatch) and PLA-1 (70 mass % in entire 100 mass % of masterbatch)

The core-shell type acrylic based polymer used was Paraloid BPM500 supplied by Rohm and Haas Japan K.K. (consisting of core layer of butyl acrylate polymer and shell layer of methyl methacrylate polymer).

[Ionic Surface Active Agent (B) Used]

(B-1):

Sodium alkyl sulfonate (trade name Chemistat 3033, supplied by Sanyo Chemical Industries Ltd.)

(B-2):

Lithium alkyl benzene sulfonate (trade name Elecut S-417, supplied by Takemoto Oil & Fat Co., Ltd.)

[Nonionic Surface Active Agent (C) Used]

(C-1):

Higher fatty acid amide (trade name Elecut S-154, supplied by Takemoto Oil & Fat Co., Ltd.)

(C-2):

Polyglycerin fatty acid ester (trade name Poem J-40481V, supplied by Riken Vitamin Co., Ltd.)

(C-3):

Ethylene oxide adduct of aliphatic amine (trade name Electrostripper TS9B, supplied by Kao Corporation)

(C-4):

Sorbitan fatty acid ester (trade name Poem S-250, supplied by Riken Vitamin Co., Ltd.)

(C-5):

Fatty acid amine (trade name Amine 2C, supplied by Lion Akzo Co., Ltd.)

(C-6):
Polyoxyethylene glycerin monostearate (trade name Poem S-105, supplied by Riken Vitamin Co., Ltd.)
[Surface Active Agent For Coating Used]
(AS-1):
Aqueous solution of sucrose fatty acid ester (trade name Rikemal A, supplied by Riken Vitamin Co., Ltd.)
[Preparation of Polylactic Acid Based Sheet]

Example 1

A polylactic acid resin, ionic surface active agent, and nonionic surface active agent as listed in Table 1-1 were supplied at mass % proportions as given in Table 1-1 to a vent-type twin screw extruder, melt-kneaded while being deaerated from the vacuum vent portion, extruded from a T-die orifice with an orifice temperature set at 210° C., and discharged into between a pair of a casting drum and a polishing roll that were cooled at 40° C. and rotating in the direction of mutual contact so that the material was cooled and solidified after coming in close contact with the casting drum, thereby preparing an unstretched polylactic acid based resin sheet with a thickness of 0.2 mm.

Results of evaluation of the sheet thus prepared are shown in Table 1-1.

Examples 2 to 9, and Comparative Examples 1 to 6, and 8

Except that the polylactic acid resin, impact strength modifier, impact strength modifier masterbatch, ionic surface active agent, and nonionic surface active agent as listed in Table 1-1 and Table 1-2 were replaced with others listed in Table 1-1 and Table 1-2, which were used at mass % proportions given in the same tables, the same procedure as in Example 1 was carried out to produce polylactic acid based resin sheets.

Results of evaluation of the sheets thus prepared are shown in Table 1-1 and Table 1-2.

Example 10

Polylactic acid, impact strength modifier masterbatch, ionic surface active agent, and nonionic surface active agent as listed in Table 1-3, which were designed to produce a layer d and a layer e, were supplied at mass % proportions and thickness ratios as given in Table 1-3 to separate, independent vent-type twin screw extruders, melt-kneaded while being deaerated from the vacuum vent portion, extruded from a T-die orifice with an orifice temperature set at 210° C., and discharged into between a pair of a casting drum and a polishing roll that were cooled at 40° C. and rotating in the direction of mutual contact so that the resin was cooled and solidified after coming in close contact with the casting drum, thereby preparing an unstretched polylactic acid based resin sheet with a thickness of 0.2 mm. Results of evaluation of the sheet thus prepared are shown in Table 1-3.

Examples 11-18

Except that the polylactic acid resin, impact strength modifier, impact strength modifier masterbatch, ionic surface active agent, and nonionic surface active agent as listed in Table 1-3, which were used at mass % proportions given in the same table, the same procedure as in Example 10 was carried out to produce polylactic acid based resin sheets. Results of evaluation of the sheets thus prepared are shown in Table 1-3.

TABLE 1-1

| | | Example 1 | Example 2 | Example 3 | Example 4 | Example 5 | Example 6 | Example 7 | Example 8 | Example 9 |
|---|---|---|---|---|---|---|---|---|---|---|
| polylactic acid (mass %) | PLA-1 | 99 | 98.95 | 94 | 79.2 | 99.05 | 96.9 | 89.02 | 89.4 | 99 |
| impact strength modifier (mass %) | SP-1 | — | — | 5 | — | — | 2.5 | — | — | — |
| impact strength modifier master batch (mass %) | MB-1 | — | — | — | 20 | — | — | 10 | 10 | — |
| ionic surface active agent (mass %) | B-1 | 0.9 | 0.9 | 0.9 | 0.7 | 0.9 | 0.4 | — | — | — |
| | B-2 | — | — | — | — | — | — | 0.9 | 0.5 | 0.6 |
| nonionic surface active agent (mass %) | C-1 | 0.1 | — | — | — | 0.05 | 0.2 | — | — | — |
| | C-2 | — | — | — | 0.1 | — | — | — | — | — |
| | C-3 | — | 0.15 | 0.1 | — | — | — | — | — | — |
| | C-4 | — | — | — | — | — | — | 0.08 | — | — |
| | C-5 | — | — | — | — | — | — | — | 0.1 | — |
| | C-6 | — | — | — | — | — | — | — | — | 0.1 |
| coating agent | AS-1 | — | — | — | — | — | — | — | — | — |
| content of polylactic acid (A) in 100 mass % of composition (D) | (mass %) | 99 | 98.95 | 94 | 93.2 | 99.05 | 96.9 | 96.02 | 96.4 | 99 |
| mass ratio between surface active agents (B) and (C) | (B)/(C) | 9 | 6 | 9 | 7 | 18 | 2 | 11.25 | 5 | 6 |
| antistatic property | surface specific resistance ($\Omega/\square$) | $5.4 \times 10^9$ | $2.7 \times 10^9$ | $3.4 \times 10^9$ | $6.1 \times 10^9$ | $3.3 \times 10^{10}$ | $7.8 \times 10^{10}$ | $5.1 \times 10^9$ | $2.2 \times 10^{10}$ | $4.1 \times 10^9$ |
| ink adhesion | | ○ | ○ | ○ | ○ | ○ | ○ | ○ | ○ | ○ |
| blocking resistance | | ○ | ○ | ○ | ○ | ○ | ○ | ○ | ○ | ○ |
| thickness of sheet | (mm) | 0.20 | 0.20 | 0.20 | 0.20 | 0.20 | 0.20 | 0.20 | 0.20 | 0.20 |
| haze value | (%) | 4.4 | 5.0 | 7.8 | 5.5 | 7.5 | 5.0 | 4.8 | 4.7 | 3.8 |
| surface tension | (mN/m) | 42 | 43 | 44 | 42 | 40 | 40 | 43 | 40 | 42 |
| impact resistance | impact value (N·m/mm) | 2.0 | 2.0 | 3.0 | 4.0 | 2.0 | 2.6 | 2.7 | 2.7 | 2.0 |

TABLE 1-1-continued

|  |  | Example 1 | Example 2 | Example 3 | Example 4 | Example 5 | Example 6 | Example 7 | Example 8 | Example 9 |
|---|---|---|---|---|---|---|---|---|---|---|
| antifogging property | molded product 1 | ○ | ○ | ○ | ○ | ○ | Δ | ○ | Δ | ○ |
|  | molded product 2 | ○ | ○ | ○ | ○ | ○ | Δ | ○ | Δ | ○ |

TABLE 1-2

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| polylactic acid (mass %) | PLA-1 | 100 | 99.1 | 99.1 | 97 | 96.5 | 97.9 | 100 | 99.7 |
| impact strength modifier (mass %) | SP-1 | — | — | — | — | 2.5 | — | — | — |
| impact strength modifier master batch (mass %) | MB-1 | — | — | — | — | — | — | — | — |
| ionic surface active agent (mass %) | B-1 | — | 0.9 | — | — | 0.45 | 2.2 | — | — |
|  | B-2 | — | — | — | — | — | — | — | 0.25 |
| nonionic surface active agent (mass %) | C-1 | — | — | — | — | — | — | — | — |
|  | C-2 | — | — | — | — | — | — | — | — |
|  | C-3 | — | — | 0.9 | 3 | 0.9 | 0.1 | — | 0.05 |
|  | C-4 | — | — | — | — | — | — | — | — |
|  | C-5 | — | — | — | — | — | — | — | — |
|  | C-6 | — | — | — | — | — | — | — | — |
| coating agent | AS-1 | — | — | — | — | — | — | Coating weight: 0.05 g/m² | — |
| content of polylactic acid (A) in 100 mass % of composition (D) | (mass %) | 100 | 99.1 | 99.1 | 97 | 97 | 97 | 100 | 99.7 |
| mass ratio between surface active agents (B) and (C) | (B)/(C) | 0 | 0 | 0 | 0 | 0.5 | 22 | 0 | 5 |
| antistatic property | surface specific resistance (Ω/□) | $6.0 \times 10^{15}$ | $4.4 \times 10^{15}$ | $1.8 \times 10^{15}$ | $4.0 \times 10^{15}$ | $2.2 \times 10^{14}$ | $7.1 \times 10^{14}$ | $1.6 \times 10^{9}$ | $5.2 \times 10^{13}$ |
| ink adhesion |  | ○ | ○ | ○ | ○ | x | x | x | ○ |
| blocking resistance |  | ○ | ○ | ○ | x | x | x | x | ○ |
| thickness of sheet | (mm) | 0.20 | 0.20 | 0.20 | 0.20 | 0.20 | 0.20 | 0.20 | 0.20 |
| haze value | (%) | 2.0 | 4.8 | 2.5 | 2.7 | 4.3 | 11 | 2.1 | 2.6 |
| surface tension | (mN/m) | 36 | 38 | 36 | 36 | 36 | 36 | 54 or more | 36 |
| impact resistance | impact value (N·m/mm) | 1.9 | 2 | 2 | 2 | 2.6 | 2.6 | 1.8 | 1.9 |
| antifogging property | molded product 1 | x | x | x | x | Δ | Δ | Δ | Δ |
|  | molded product 2 | x | x | x | x | Δ | Δ | Δ | Δ |

TABLE 1-3

|  |  |  | Example 10 | Example 11 | Example 12 | Example 13 | Example 14 | Example 15 | Example 16 | Example 17 | Example 18 |
|---|---|---|---|---|---|---|---|---|---|---|---|
| layer d = composition (D) | polylactic acid (mass %) | PLA-1 | 78.82 | 99.4 | 68.9 | 89.1 | 94.05 | 81.3 | 60 | 55.1 | 30 |
|  | impact strength modifier (mass %) | SP-1 | — | — | — | 10 | 5 | 18 | 29 | 44 | 39 |
|  | impact strength modifier master batch (mass %) | MB-1 | 20 | — | 30 | — | — | — | 10 | — | 30 |
|  | ionic surface active agent (mass %) | B-1 | 1.1 | 0.5 | 0.8 | — | 0.9 | — | 0.9 | 0.8 | 0.9 |
|  |  | B-2 | — | — | — | 0.8 | — | 0.6 | — | — | — |
|  | nonionic surface active agent (mass %) | C-2 | — | — | — | — | — | 0.1 | — | — | — |
|  |  | C-3 | 0.08 | 0.1 | 0.1 | 0.1 | 0.05 | — | 0.1 | 0.1 | 0.1 |

TABLE 1-3-continued

| | | Example 10 | Example 11 | Example 12 | Example 13 | Example 14 | Example 15 | Example 16 | Example 17 | Example 18 |
|---|---|---|---|---|---|---|---|---|---|---|
| layer e | polylactic acid PLA-1 (mass %) | 100 | 100 | 100 | 100 | 99.5 | 98.3 | 100 | 99.4 | 79 |
| | impact strength modifier SP-1 (mass %) | — | — | — | — | 0.5 | 1 | — | — | — |
| | impact strength modifier master batch MB-1 (mass %) | — | — | — | — | — | — | — | — | 20 |
| | ionic surface tacive agent B-1 (mass %) | — | — | — | — | — | 0.6 | — | 0.5 | 0.9 |
| | nonionic surface active agent C-3 (mass %) | — | — | — | — | — | 0.1 | — | 0.1 | 0.1 |
| layer constitute | | d/e/d | d/e/d | d/e/d | d/e/d | d/e/d | d/e/d | d/e/d | d/e/d | d/e/d |
| layer thickness ratio | | 1/8/1 | 1/8/1 | 2/6/2 | 1/8/1 | 1/8/1 | 1/8/1 | 1/8/1 | 1/8/1 | 1/8/1 |
| content of polylactic acid (A) in 100 mass % of composition (D) | (mass %) | 92.82 | 99.4 | 89.9 | 89.1 | 94.05 | 81.3 | 67 | 55.1 | 51 |
| mass ratio between surface active agents (B) and (C) | (B)/(C) | 13.75 | 5 | 10 | 8 | 18 | 6 | 9 | 8 | 11 |
| antistatic property | surface specific resistance ($\Omega/\square$) | $4.1 \times 10^{10}$ | $3.7 \times 10^{11}$ | $2.8 \times 10^{11}$ | $3.5 \times 10^{11}$ | $5.3 \times 10^{10}$ | $7.8 \times 10^{10}$ | $8.8 \times 10^{9}$ | $1.1 \times 10^{10}$ | $2.3 \times 10^{10}$ |
| ink adhesion | | ○ | ○ | ○ | ○ | ○ | ○ | ○ | ○ | ○ |
| blocking resistance | | ○ | ○ | ○ | ○ | ○ | ○ | ○ | ○ | ○ |
| thickness of sheet | (mm) | 0.20 | 0.20 | 0.20 | 0.20 | 0.20 | 0.20 | 0.20 | 0.20 | 0.20 |
| haze value | (%) | 3.0 | 2.4 | 3.2 | 6.5 | 5.9 | 7.8 | 14 | 18 | 22 |
| surface tension | (mN/m) | 42 | 40 | 42 | 42 | 42 | 42 | 42 | 42 | 42 |
| impact resistance | impact value (N·m/mm) | 2.6 | 2.1 | 3.1 | 2.7 | 2.4 | 3.0 | 3.3 | 3.8 | 4.5 |
| antifogging property | molded product 1 | ○ | Δ | ○ | ○ | ○ | ○ | ○ | ○ | ○ |
| | molded product 2 | ○ | Δ | ○ | ○ | ○ | ○ | ○ | ○ | ○ |

Comparative Example 7

A polylactic acid resin as given in Table 1-2 was supplied to a vent-type twin screw extruder, extruded from a T-die orifice with an orifice temperature set at 210° C., and discharged into between a pair of a casting drum and a polishing roll that are cooled at 40° C. and rotating in the direction of mutual contact so that the material was cooled and solidified after coming in close contact with the casting drum, thereby preparing an unstretched polylactic acid based resin sheet with a thickness of 0.2 mm. Subsequently, both surfaces were subjected, one at a time, to corona treatment, and coated, one at a time, with an aqueous coating liquid of the coating-type surface active agent AS-1 by the gravure roll method, and dried in a drying furnace to produce a surface active agent-coated layer having a final coating weight as described in Table 1-2, followed by taking up the resulting coated sheet on a winder.

Results of evaluation of the sheet thus prepared are shown in Table 1-2.

The polylactic acid based resin sheets prepared in Examples 1 to 18 at any level had good antistatic property, ink adhesion, and blocking resistance. In particular, those in Examples 1 to 5, 7, 9 to 10, and 12 to 18 had good antifogging property in addition to antistatic property, ink adhesion, and blocking resistance.

Those prepared in Comparative Examples 1 to 6, and 8, on the other hand, were inferior in antistatic property, and significantly different from those in Examples. Those prepared in Comparative Examples 5 and 7 were inferior in ink adhesion and blocking resistance and significantly different from those in Examples.

The invention claimed is:

1. A polylactic acid based resin sheet comprising multiple layers wherein a core layer comprises polylactic acid resin and a layer is formed of a composition (D) containing polylactic acid (A), an ionic surface active agent (B), a nonionic surface active agent (C) and an impact strength modifier (E) comprising a multi-layered structured polymer, wherein
content of the impact strength modifier (E) is 2 mass % or more and 20 mass % or less in the entire 100 mass % of the composition (D),
content of the polylactic acid (A) is 50 mass % or more and 99.5% or less in the entire 100 mass % of the composition (D),
mass ratio, (B)/(C), between the ionic surface active agent (B) and the nonionic surface active agent (C) satisfies 6 ≤(B)/(C) ≤18, and
the resin sheet has a haze value of 10% or less and either or both of the outermost layers are formed of the composition (D).

2. The polylactic acid based resin sheet as defined in claim 1, wherein
the ionic surface active agent (B) has a sulfo group, and
the nonionic surface active agent (C) is at least one selected from the following group consisting of:
aliphatic alkanol amide, polyglycerin fatty acid ester, higher alcohol (i), alkyl phenol (ii), fatty acid ester (iii), aliphatic amine (iv), aliphatic amide (v), polypropylene glycol (vi), sorbitan fatty acid ester (vii), and ethylene oxide adducts of (i) to (vii).

3. The polylactic acid based resin sheet as defined in claim 1, having a wetting tension of 40 mN/m or more.

4. The polylactic acid based resin sheet as defined in claim 1, adapted to be processed by hot-plate-direct-heating-type vacuum molding or hot-plate-direct-heating-type vacuum air-pressure molding.

5. A molded product produced from a polylactic acid based resin sheet as claimed in claim 1.

6. The polylactic acid based resin sheet as defined in claim 2, having a wetting tension of 40 mN/m or more.

7. The polylactic acid based resin sheet as defined in claim 2, adapted to be processed by hot-plate-direct-heating-type vacuum molding or hot-plate-direct-heating-type vacuum air-pressure molding.

8. The polylactic acid based resin sheet as defined in claim 3, adapted to be processed by hot-plate-direct-heating-type vacuum molding or hot-plate-direct-heating-type vacuum air-pressure molding.

9. The polylactic acid based resin sheet as defined in claim 1, wherein the ionic surface active agent (B) has a sulfo group, and the nonionic surface active agent (C) is at least one selected from the following group consisting of aliphatic alkanol amide, polyglycerin fatty acid ester, higher alcohol (i), alkyl phenol (ii), fatty acid ester (iii), aliphatic amine (iv), aliphatic amide (v), polypropylene glycol (vi), sorbitan fatty acid ester (vii), and ethylene oxide adducts of (i) to (vii), and the impact strength modifier (E) is an additive which, when mixed in polylactic acid, acts to form a sea-island structure in which the polylactic acid is the sea component while the additive is the island component, with the additive being in a form of dispersed particles smaller than spheres with a diameter of about 10 μm and has a lower elastic modulus than that of the polylactic acid.

10. The polylactic acid based resin sheet as defined in claim 9, wherein the impact strength modifier is a core-shell acrylic based polymer.

\* \* \* \* \*